United States Patent
Thouppuarachchi

(10) Patent No.: US 12,393,641 B2
(45) Date of Patent: *Aug. 19, 2025

(54) METHODS FOR UTILIZING SOLVER HARDWARE FOR SOLVING PARTIAL DIFFERENTIAL EQUATIONS

(71) Applicant: Vorticity Inc., Redwood City, CA (US)

(72) Inventor: Chirath Neranjena Thouppuarachchi, Redwood City, CA (US)

(73) Assignee: Vorticity Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,841

(22) Filed: Jan. 12, 2024

(65) Prior Publication Data

US 2024/0211531 A1   Jun. 27, 2024

Related U.S. Application Data

(63) Continuation of application No. 16/989,825, filed on Aug. 10, 2020, now Pat. No. 11,921,813.

(60) Provisional application No. 62/889,550, filed on Aug. 20, 2019.

(51) Int. Cl.
  *G06F 17/13*  (2006.01)
  *G06F 11/34*  (2006.01)
  *G06F 30/20*  (2020.01)
  *G06F 111/10*  (2020.01)

(52) U.S. Cl.
  CPC .......... *G06F 17/13* (2013.01); *G06F 11/3409* (2013.01); *G06F 30/20* (2020.01); *G06F 2111/10* (2020.01)

(58) Field of Classification Search
  CPC ...... G06F 17/13; G06F 2111/10; G06F 30/20; G06F 11/3409; G06F 30/28

USPC .......................................................... 708/446
See application file for complete search history.

(56) References Cited

U.S. PATENT DOCUMENTS

| | | | |
|---|---|---|---|
| 4,720,780 | A | 1/1988 | Dolecek |
| 6,041,398 | A | 3/2000 | Pechanek et al. |
| 8,583,720 | B2 | 11/2013 | Kusmanoff et al. |
| 10,151,856 | B1 | 12/2018 | Copeland |
| 2013/0116988 | A1 | 5/2013 | Zhang et al. |

(Continued)

OTHER PUBLICATIONS

Evans, D., et al. "Construction of extrapolation tables by systolic arrays for solving ordinary differential equations." Parallel computing vol. 4, Issue 1, Feb. 1, 1987, pp. 33-48.

(Continued)

*Primary Examiner* — Tan V Mai
(74) *Attorney, Agent, or Firm* — Fenwick & West LLP

(57) ABSTRACT

Embodiments relate to a computing system for solving differential equations. The system is configured to receive problem packages corresponding to problems to be solved, each comprising at least a differential equation and a domain, and to select a solver of a plurality of solvers, based upon availability of each of the plurality of solvers. A dispatch computer selects a solver by monitoring the plurality of solvers, and responsive to a solver becoming available, determines if a received problem package having at least a threshold priority level can be solved by the solver. Otherwise, the dispatch computer generates a plurality of solver scenarios each reflecting a permutation of received problem packages assigned to solvers estimated to become available within a threshold period of time, and assigns the problem packages in accordance with a solver scenario having a highest utilization score.

20 Claims, 8 Drawing Sheets

(56) References Cited

U.S. PATENT DOCUMENTS

| | | |
|---|---|---|
| 2014/0324399 A1 | 10/2014 | Barron et al. |
| 2016/0267349 A1 | 9/2016 | Shoaib et al. |
| 2018/0307980 A1 | 10/2018 | Barik et al. |
| 2018/0314780 A1 | 11/2018 | Bertilsson et al. |
| 2020/0301876 A1 | 9/2020 | Hamlin |
| 2021/0019591 A1 | 1/2021 | Venkatesh et al. |
| 2022/0148130 A1 | 5/2022 | Tang et al. |

OTHER PUBLICATIONS

Evans, D., et al. "Systolic arrays for group explicit methods for solving parabolic partial differential equations." The Computer Society, May 25-27, 1988, pp. 315-329.

Jainandunsing, K. "Parallel algorithms for solving systems of linear equations and their mapping on systolic arrays," College of Deans, Jan. 3, 1989, pp. 1-195.

Strbac, P., et al. "Hierarchical Model of a Systolic Array for Solving Differential Equations Implemented as an Upgraded Petri Net", WSEAS Transactions on Systems, Issue 1, vol. 8, Jan. 2009, pp. 1-10.

United States Office Action, U.S. Appl. No. 16/989,821, filed Jul. 29, 2022, 22 pages.

United States Office Action, U.S. Appl. No. 16/989,829, filed Feb. 11, 2022, 8 pages.

United States Office Action, U.S. Appl. No. 16/989,829, filed Aug. 30, 2021, 22 pages.

United States Office Action, U.S. Appl. No. 16/989,825, filed Jun. 28, 2023, 7 pages.

United States Office Action, U.S. Appl. No. 18/194,321, filed Feb. 15, 2024, 22 pages.

METHODS FOR UTILIZING SOLVER HARDWARE FOR SOLVING PARTIAL DIFFERENTIAL EQUATIONS

CROSS-REFERENCE TO RELATED APPLICATION

This application is a continuation of pending U.S. application Ser. No. 16/989,825, filed on Aug. 10, 2020, which claims the benefit of U.S. Provisional Application No. 62/889,550, filed on Aug. 20, 2019, the forgoing which are hereby incorporated by reference in their entireties.

BACKGROUND

The present disclosure generally relates to methods of using dedicated solver hardware for solving partial differential equations.

Differential equations are ubiquitous in describing fundamental laws of nature, human interactions and many other phenomena. Applications include fluid dynamics, molecular dynamics, electronic structure, high frequency options trading, brain tissue simulations, satellite orbitals, nuclear explosion simulations, black hole simulations, etc.

Solving differential equations has been a major use of computers since their advent in the mid-1900s. Today, estimates show that over 50% of high performance computing is diverted towards solving differential equations, from supercomputers at national labs to small computer clusters in medium size companies. As such, a need exists for computers that can more efficiently solve differential equations.

SUMMARY

Embodiments relate to a system for solving differential equations. The system is configured to receive and enqueue problem packages corresponding to problems to be solved, each comprising at least a differential equation and a domain. A dispatch computer retrieves problem packages from the queue, and selects a solver of a plurality of solvers, based upon availability of each of the plurality of solvers, for which to assign the problem package. In some embodiments, the dispatch computer selects a solver by, responsive to a solver becoming available, determining if a received problem package in the queue has at least a threshold priority level, and if the received problem package can be solved by the solver. If so, the dispatch computer assigns the identified high-priority problem package to the solver.

In one or more embodiments, if the solver is not available (e.g., if no problem package has at least the threshold priority level or if the available solver is not suitable for solving the problem package), the dispatch computer determines estimated completion times for solvers of the plurality of solvers estimated to become available within a threshold period of time, and generates a plurality of solver scenarios each reflecting a permutation of received problem packages assigned to solvers estimated to become available within the threshold period of time. The dispatch computer determines a utilization metric for each generated scenario, assigns the problem packages in accordance with a selected solver scenario having a highest utilization metric.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments herein are directed to a purpose built computing architecture to enable fast solving of differential equations within large domains with complicated boundary conditions. Differential equations are ubiquitous in describing fundamental laws of nature, human interactions and many other phenomena. Applications of differential equations include fluid dynamics, molecular dynamics, electronic structure, high frequency options trading, brain tissue simulations, satellite orbitals, nuclear explosion simulations, black hole simulations, etc.

While simple differential equations can be solved with analytical solutions, many more complicated differential equations must be solved numerically in order to obtain useful results. This usually involves breaking up a problem domain into many slices/nodes/particles etc., and solving a discretized form of the equation on each slice/node/particle. This can be a tedious process. In addition, as domain size and accuracy requirements increase (e.g., resolution of the solution, maximum partition size possible, etc.), the number of calculations needed to be performed can increase dramatically.

The usage of current computer systems (e.g., general-purpose computers) has several problems. In many applications, each particle or node in the domain of the differential equation to be solved requires perhaps $\sim 10^2$-$10^3$ floating point operations to calculate the next time step. Since these operations have to be done sequentially, the best time scaling that the simulation or solution can achieve is described in Equation (1) below, even without accounting for the clock cycles needed in a von Neumann architecture to fetch instructions, decode, access memory multiple times to perform a single operation.

$$\frac{\text{computer clock speed }[s-1]}{\text{operations per node }[\text{timestep}-1] \times \text{number of nodes in domain}} \text{timesteps/second} \quad (1)$$

For problems that require "strong vertical scaling" such as molecular dynamics, this ceiling is a major problem where even the best supercomputers can only muster several microseconds of simulation time for several days' worth of compute time.

Figure 1:
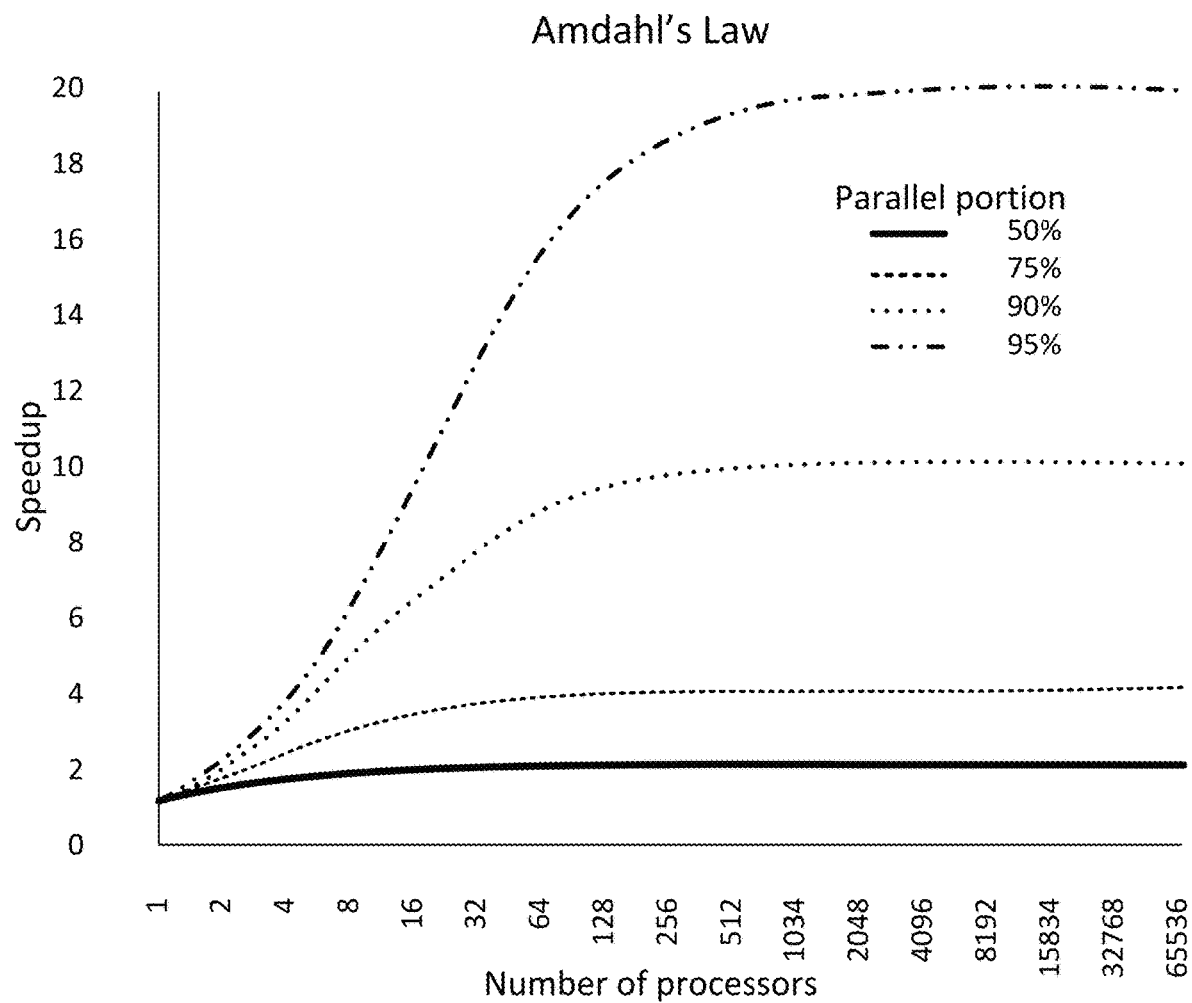
FIG. 1 is a graph illustrating the effects of Amdahl's law.

When possible, for large domain sizes, parallel computing can be used to speed up the solution. However the need to pass large amounts of data between the computing units in such a setup slows down the time to solution. For example, when engineers use 1000 cores, the speed up is no more than 10 times as using a single core. This problem is generally referred to as Amdahl's law. FIG. 1 is a graph illustrating the effects of Amdahl's law. As illustrated in FIG. 1, the speed up in latency of the execution of tasks from using additional parallel processors levels off even as additional parallel processors are added, due to the speedup being limited by the serial portion of the program.

In some applications, a problem may consist of both a small time scale and a very large domain size. An example of this is direct numerical simulations of the Navier Stokes equation. Typically, these types of problems are never solved except on rare occasions on national super computers despite the unprecedented accuracy.

In addition, in cases where the solution at a particular time interval needs to be recorded, then in most cases the computation will stop to download this timestep information, further adding to the time to solution for a given problem.

System Overview

Figure 2:
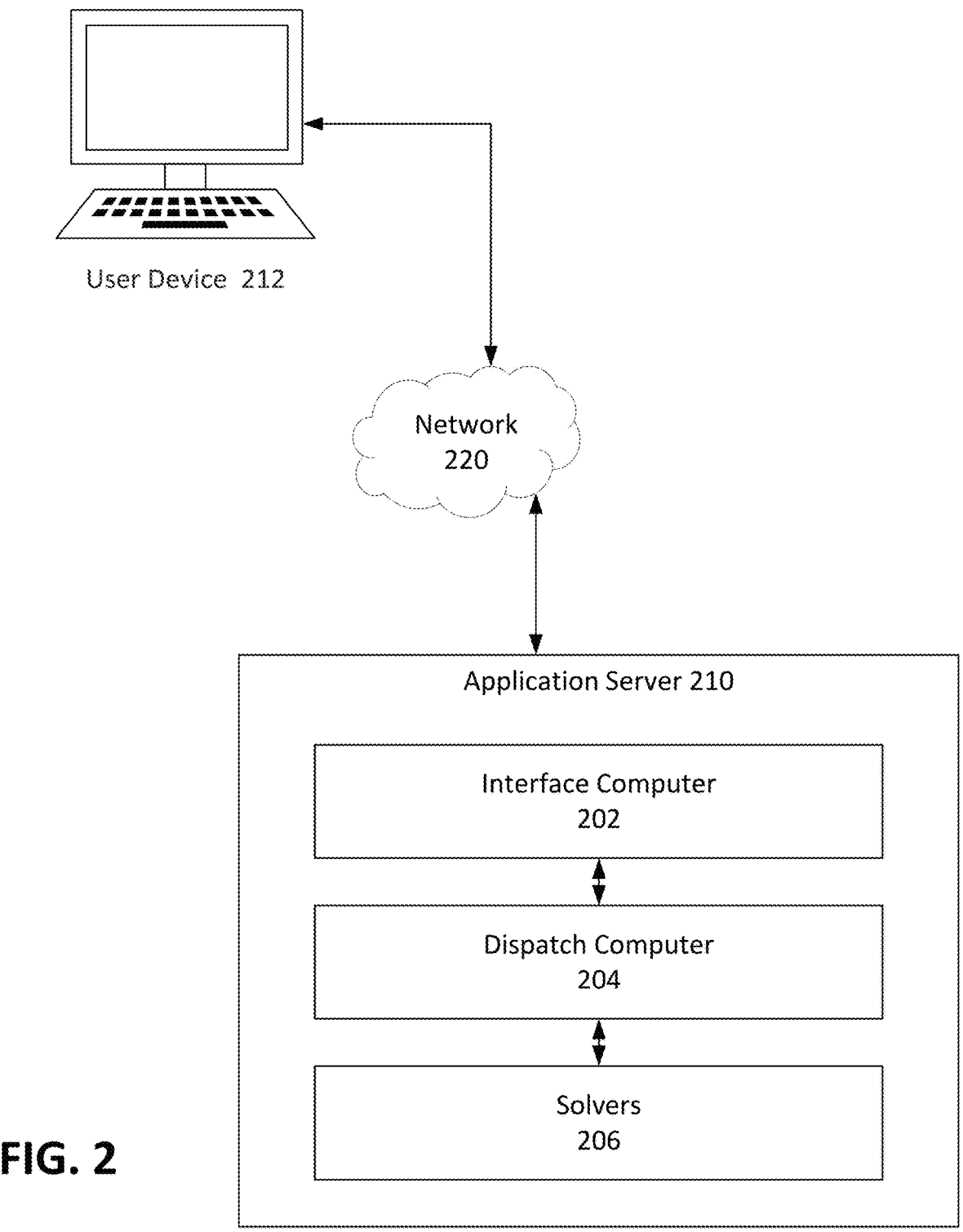
FIG. 2 illustrates a high level diagram of a system for solving differential equations, in accordance with some embodiments.

Embodiments are directed to a computer architecture specialized to solve differential equations that addresses the problems expounded above. FIG. 2 illustrates a high level diagram of a system for solving differential equations, in accordance with some embodiments. The system comprises an interface computer or circuit 202, a dispatch computer or circuit 204, and a plurality of solver units 206 (or solvers 206). In some embodiments, the interface computer 202, dispatch computer 204, and solver units 206 are implemented on an application server 210. While FIG. 2 illustrates a single application server 210, it is understood that in other embodiments, the interface computer 202, dispatch computer 204, and solvers 206 may be implemented on multiple servers or devices, on a cloud server, etc.

In some embodiments, the user accesses the application server 210 from a user device 212, such as a PC, laptop, workstation, mobile device, etc. The user device 212 may access the application server 210 through a network 220 (e.g., the Internet). In other embodiments, the user device 212 may connect to the application server 210 via a direct line connection (e.g., a direct line connection to the interface computer 202). In addition, although FIG. 1 only shows a single user device 212 connecting to the application server 210, it is understood that in some embodiments, many user devices may concurrently connect to the application server 210 (e.g., via the network 220).

The user at the user device 212 may transmit to the application server 210 (e.g., through the network 220) one or more problems involving differential equations to be solved. In some embodiments, the user device 212 transmits each problem in the form of the problem package, comprising at least a differential equation associated with the problem, and a domain. In some embodiments, the problem package further comprises a mesh (or particle domain) for the problem, one or more boundary conditions, initial conditions, flow conditions (such as density and viscosity), a solve type (e.g., 3D incompressible DNS Navier Stokes), and/or the like. The problem package may be sent to the interface computer 202 over the secured internet using a provided API of the interface computer 202.

The interface computer 202 receives the problem package, which is processed by the dispatch computer 204 and dispatched to the solvers 206. The solvers 206 generate a solutions package comprising a solved domain that is transmitted back to the user device 212. The solutions package may further comprise one or more averages, one or more solver metrics, one or more errors messages, etc.

Figure 3:
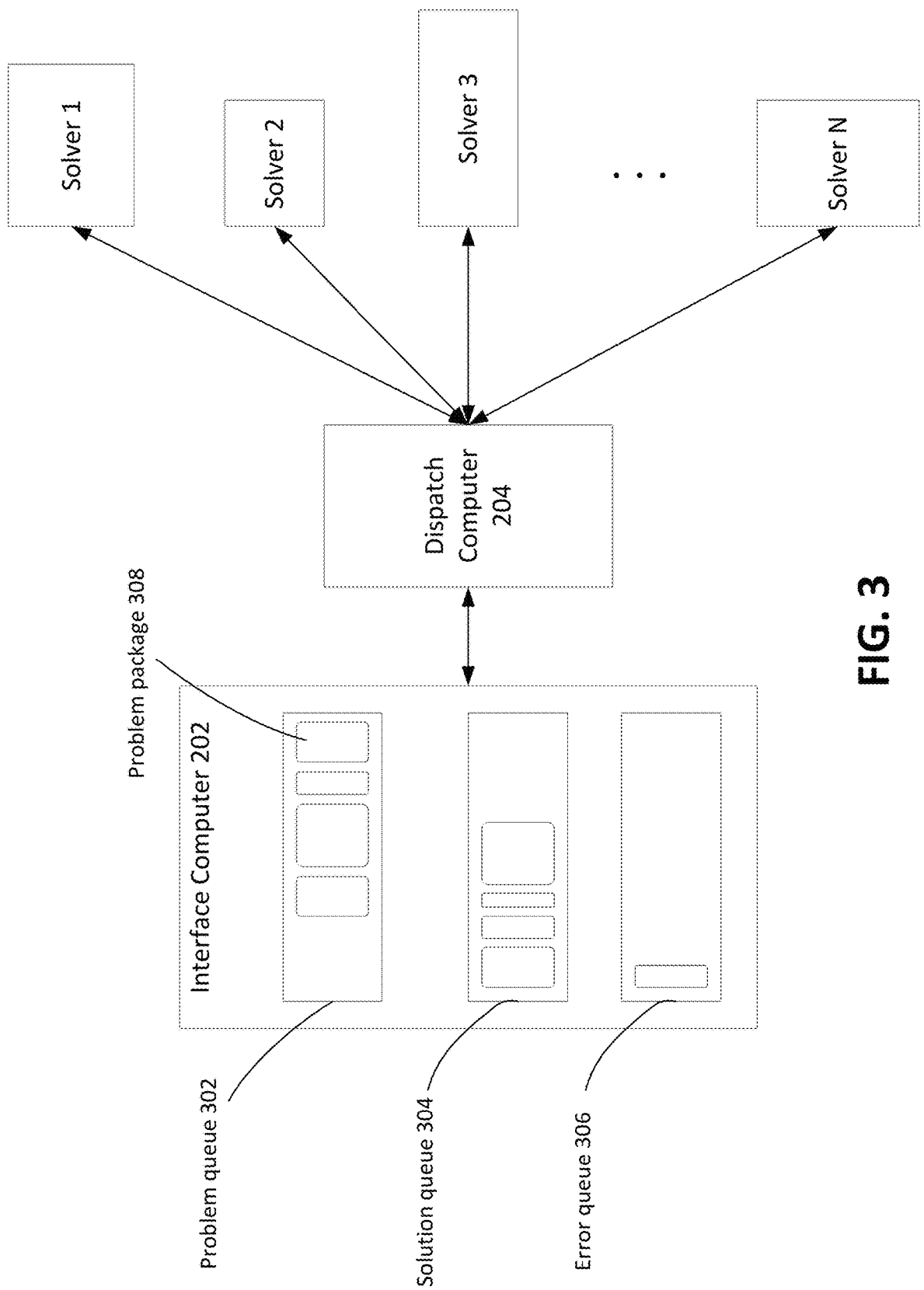
FIG. 3 illustrates a diagram of the interface computer, dispatch computer, and solver units, in accordance with some embodiments.

FIG. 3 illustrates a diagram of the interface computer 202, dispatch computer 204, and solver units 206, in accordance with some embodiments. The interface computer 202 is networked to both the user (e.g., the user device 212) and the dispatch computer 204. The interface computer 202 comprises a problem queue 302, a solution queue 304, and an error queue 306. The interface computer 202 is configured to accept incoming problems to be solved by various interested parties (e.g., problem packages from one or more users at user devices 212), and add the received problem packages 308 to the problem queue 302. In some embodiments, the interface computer 202 may first check the received problem package for accuracy. For example, the interface computer 202 may, if the problem package specifies a time step size and is associated with certain types of differential equations, that the specified time step conforms with the Courant-Friedrichs-Lewy (CFL) convergence condition. In cases where the problem package specifies an unstructured mesh, the interface computer 202 may check if the specified mesh is well-formed. In some embodiments, the interface computer 202 may receive a problem package that comprises geometry information with initial and boundary conditions instead of a mesh, whereupon the interface computer may generate a mesh for the problem based upon the received geometry information and conditions.

The interface computer 202 sends problem packages 308 to the dispatch computer 204 to be solved by one or more of the plurality of solvers 206. In some embodiments, each problem package within the problem queue 302 may be assigned a priority level. The priority level for a problem package 302 may be based upon a provided indication within the problem package, the user from which the problem package was received, one or more parameters of the problem package (e.g., type of differential equation, size of domain, etc.), size of the problem package, an amount of time the problem package has been in the problem queue 302, and/or any combination thereof.

The interface computer 202 is further configured to receive solution information from the dispatch computer 204. In some embodiments, the solution information is received in the form of one or more solution packages (e.g., as described above). In other embodiments, the interface computer 202 reformats the received solution information to form one or more solution packages. The interface computer 202 stores the one or more solution packages in the solution queue 304, and transmits the solution packages from the solution queue 304 to their respective users (e.g., to the user devices 212 responsible for sending the problem package corresponding to the solution package).

In some embodiments, the interface computer 202 receives error information from the dispatch computer 204, corresponding to any errors encountered by the solvers 206 when solving the problem. In some embodiments, the dispatch computer 202 checks the fidelity of the results of the received solution information, and generates one or more errors if any issues are found (e.g., pressure, density, velocity, etc. parameters not being bounded). The determined errors may be stored in the error queue 306, to be transmitted to corresponding users.

The dispatch computer 204 is networked to the interface computer 202 and to one or multiple solver units 206. The dispatch computer determines which solver 206 is the best to solve a given user problem at a given time. As illustrated in FIG. 3, the dispatch computer 204 may be in communication with a plurality of solvers 206 (e.g., solvers 206-1 through 206-$n$). In some embodiments, the dispatch computer 204 monitors an availability of the solvers 206 (e.g., a capacity of each solver to process additional problems) and the problem queue 302 of the interface computer 202, in order to determine which problem packages 308 should be processed by which of the solvers 206.

Figure 4:
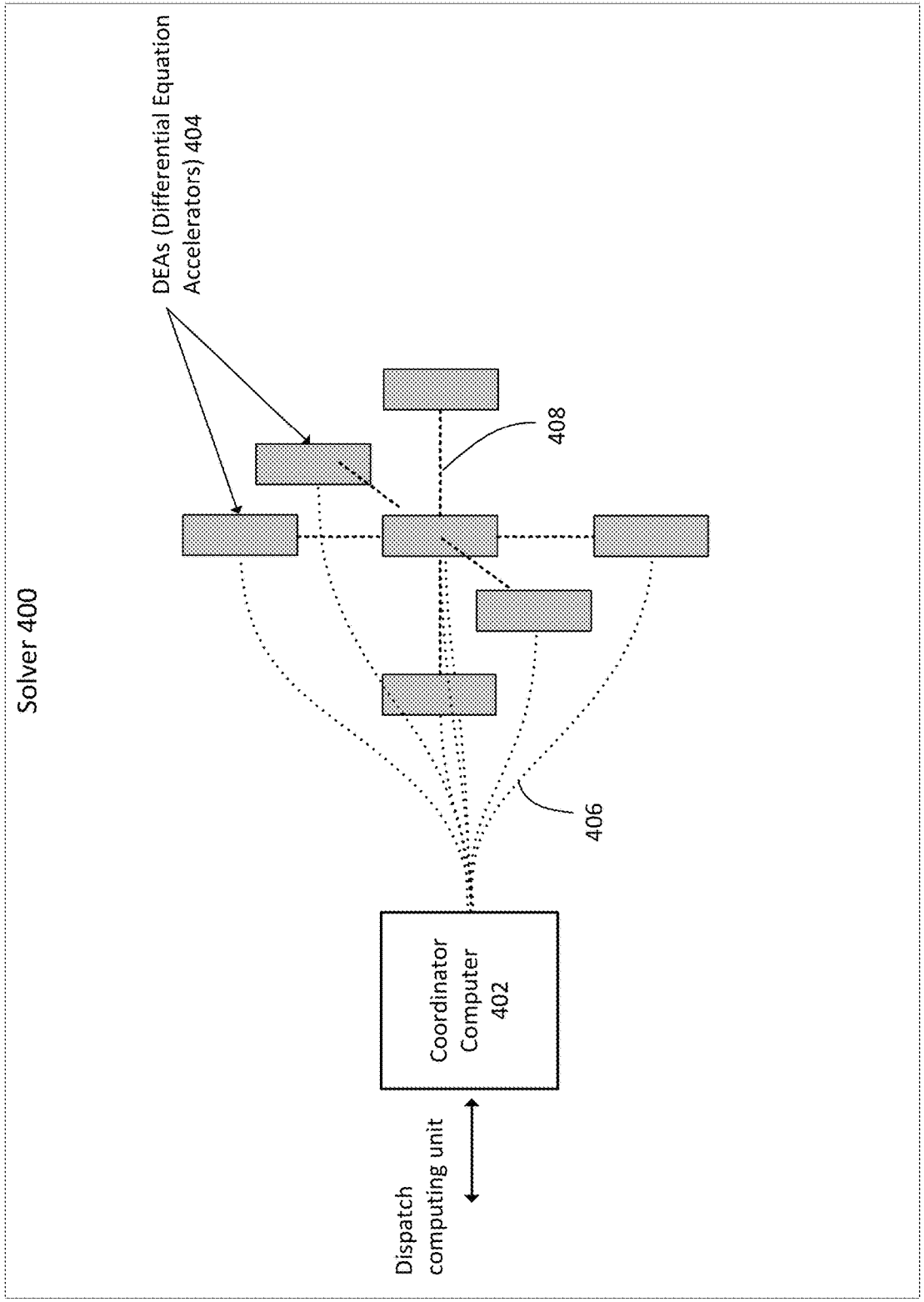
FIG. 4 is a diagram illustrating components of a solver, in accordance with some embodiments.

The solvers 206 are the workhorses of the system, and are configured to generate solutions to the various problems that come to the system. The solvers may be of different types. For example, each of the solvers 206 may be optimized for one or more specific applications, such as fluid dynamics, molecular dynamics, electronic structure, etc. In some embodiments, each solver 206 may also be optimized to solve domains of different sizes. The various sizes may help optimize the use of the hardware by allocating larger problems to the larger solvers and smaller problems to the smaller solvers FIG. 4 is a diagram illustrating components of a solver, in accordance with some embodiments. The solver 400 illustrated in FIG. 4 may correspond to one of the solvers 206 illustrated in FIGS. 2 and 3. The solver 400 comprises a coordinator computer or circuit 402, multiple compute units (referred to as Differential Equation Accelerator (DEA) circuits, or DEAs) 404, one or more DEA—Coordinator interconnects 406, and one or more DEA—DEA interconnects 408.

The coordinator computer 402 (or coordinator 402) is connected to the dispatch computer (e.g., dispatch computer 204) on one side and to multiple DEAs 404 on the other. The coordinator 402 is responsible for coordinating the various aspects of the DEA when solving a user problem. For example, the coordinator 402 may, in response to receiving a problem package, divide the domain of the problem into a plurality of subdomains, and assigns each subdomain to a respective DEA 404. The coordinator 402 may synchronize the DEAs 404 and initiates solving operations by the DEAs 404. The coordinator 402 further downloads results from each of the DEAs 404.

The solver 400 comprises a plurality of DEAs 404. Each DEA 404 is a circuit configured to receive a subdomain of a problem, and generate solution data for the received subdomain. The solution data may correspond to the subdomain processed over one or more time steps, based upon the differential equation associated with the problem. For the purposes of discussion, herein, the DEAs will be referred to as processing the subdomain data over one or more time steps, although it is understood that, depending on the type of problem to be solved, iterations other than time steps may be used. In some embodiments, the DEAs within each solver may be of the same type (e.g., having the same memory capacity, contain the same types of systolic arrays, etc.). Solvers of different sizes or configured to process different types of differential equation problems will have different DEAs.

The coordinator computer 402 and the DEAs 404 are connected via DEA—Coordinator interconnects 406 and DEA—DEA interconnects 408, allowing for the coordinator 402 to manage operations of the DEAs 404, and for the DEAs 404 to share stored domain information with each other (discussed in greater detail below).

The DEA-Coordinator interconnects 406 and DEA-DEA interconnects 408 may be implemented as cabling connecting the coordinator 402 to the DEAs 404, and the DEAs 404 to each other, respectively. In some embodiments the interconnects 406 and 408 may be implemented using PCI Express cables (e.g., PCIe v4.0). The number of interconnects between the DEAs 404 may be contingent on how the domain is sliced up across the DEAs in that solver e.g., based on a partitioning scheme of the solver for partitioning received domains. For example, if the solver is configured to slice the domain into pyramids, then the number of interconnects may be smaller compared to if the solver were configured to slice up received domains into higher order polygons. In some embodiments, if the number of DEAs 404 is large, then it may be hard to physically connect all the DEAs 404 onto one coordinator 402. In such cases, relays (not shown) can be used to bunch up some of the cabling.

Figure 5:
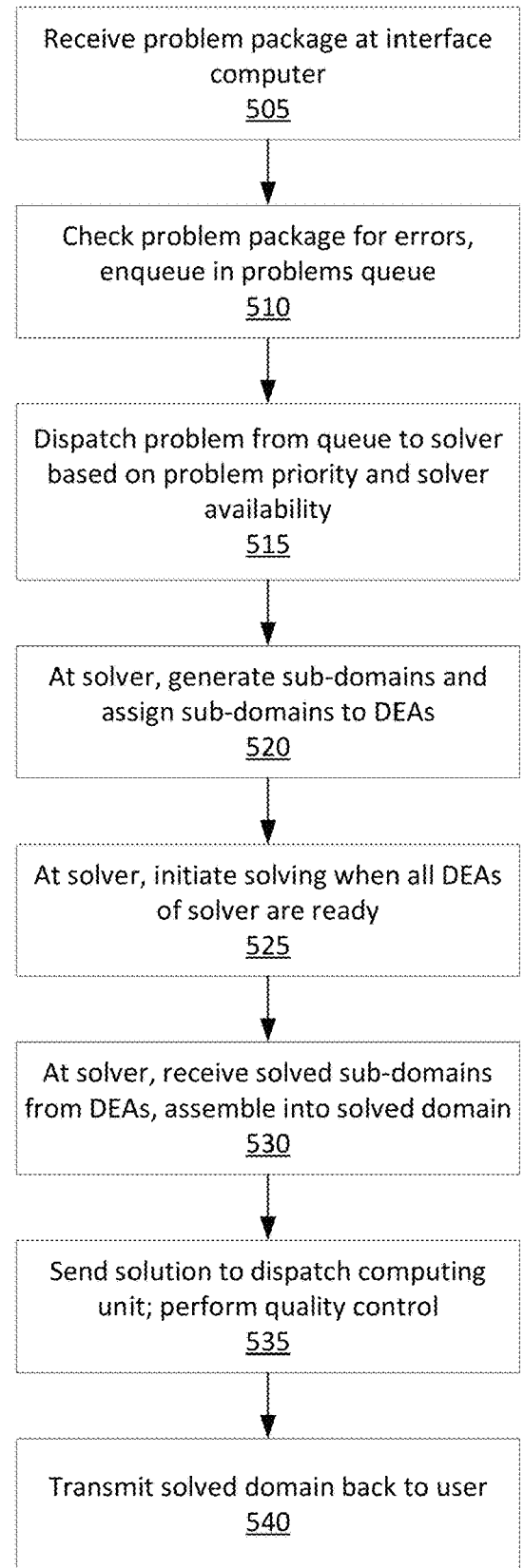
FIG. 5 is a flowchart of a process for solving a differential equation, in accordance with some embodiments.

FIG. 5 is a flowchart of a process for solving a differential equation, in accordance with some embodiments. The process 500 of FIG. 5 may be performed by the interface computer 202, dispatch computer 204, and plurality of solvers 206 illustrated in FIGS. 2 and 3.

The interface computer receives 505 a problem package from a user. In some embodiments, the problem package is formulated by the user at a user device (e.g., the user device 212), and may include a mesh or particle domain associated with the problem, one or more boundary conditions, one or more initial conditions, one or more flow conditions (e.g., density and/or viscosity), a solve type (e.g., indicating a type of differential equation to be solved, such as a 3D incompressible DNS Navier-Stokes problem), a number of time steps and/or convergence criteria, a numerical method, and/or the like. For example, a particular problem package may specify that the problem relates to 3D flow around an airfoil using DNS incompressible Navier-Stokes equations, wherein the fluid is air at sea level, and the domain is a structured mesh. In some embodiments, the user at the user device sends the problem package to the interface computer using a provided API.

In some embodiments, the interface computer checks 510 the received problem package for errors, and, if there are no errors, enqueues the problem package in a problems queue (e.g., problem queue 302). In some embodiments, if errors are detected, the interface computer notifies the user and ejects the problem package. In some embodiments, each problem package enqueued in the problem queue may be associated with a priority level. The priority level may be based upon a default value, a priority level associated with the user submitting the problem package, an amount of time the problem package has been in the problem queue without being dispatched for solving, or any combination thereof.

The dispatch computer dispatches 515 problem packages from the problem queue to one of the several solvers attached to it. In some embodiments, the dispatch computer is used to optimize the use of the solvers by choosing between the various types and sizes of the solvers attached to it. The size of a solver may be based upon a number of DEAs of the solver, an amount of memory space within each DEA, a size of the systolic arrays within each DEA of the solver, and/or a type of differential equation the systolic arrays of the DEAs are configured to solve. Additional details regarding how the dispatch computers determines how to dispatch problems to solvers is described in relation to FIG. 6 below.

The solver that receives the problem package is used to compute a solution for the problem package. To compute a solution to the problem, the coordinator of the solver analyzes the problem package to determine a domain (e.g., based on the spatial domain, boundary conditions, and/or initial conditions indicated by the problem package). In some embodiments, the coordinator may, if a mesh was not included in the problem package, generate a mesh based on the determined domain. The coordinator generates 520 subdomains from the domain, and assigns the subdomains to the DEAs of the solver. In some embodiments, the subdomains are determined by slicing the domain based upon some virtual geometry to fit the memory spaces of the DEAs of the solver. Each of the DEAs assigned a subdomain receives its respective subdomain data, as well as additional data such as fluid viscosity and density needed to solve the problem.

In some embodiments, the DEAs of the solver are configured to solve their respective subdomains concurrently. This allows for the DEAs to share subdomain data with each other during the processing for a given time step as needed, since all DEAs will be processing the same time step over a given time period. The coordinator initiates 525 solving when all DEAs of the solver having an assigned subdomain are ready. In some embodiments, each DEA signals to the coordinator when it has received its assigned subdomain data and is ready to begin solving, whereupon the coordinator issues a signal to begin solving when all DEAs having assigned subdomains have indicated that they are ready.

The DEAs each solve the problem for their respective subdomain by processing the subdomain over a plurality of time steps based upon the differential equation of the problem. The coordinator receives 530 the solved subdomains from the DEAs, and assembles the solved subdomains from the various DEAs to generate a solved domain corresponding to the original domain of the problem.

The solver sends 535 the solution (e.g., the solved domain) to the dispatch computer, which performs one or more quality control functions on the received solved domain. In some embodiments, the dispatching computer checks the fidelity of the results. For example, Table 1 below shows some of the parameters used in Navier Stokes equations that may be checked by the dispatch computer. In some embodiments, the parameters checked may be based upon a type of equation associated with the problem package.

TABLE 1

| Parameter (all values in domain) | Check |
|---|---|
| Pressure, density, velocity, temperature, energy | Bounded |
| Temperature | Not less than 0 K |
| Density, pressure | Not less than 0 |

If no errors are found, the dispatch computer may enqueue the solved domain on the solution queue of the interface computer, from where the solved domain can be transmitted 540 back to the user. The solved domain may be transmitted as part of a solution package, which may include the solved domain as well as averages, solver metrics, and/or other information.

If errors are found by the dispatch computer in the solved domain, the dispatch computer may send the problem to be solved by a different solver. Otherwise (or after at least a threshold number of different solvers have attempted to solve the problem), the error information may be enqueued in the error queue of the interface computer to be sent back to the user. In some embodiments, the user may receive, from the interface computer, the solved domain data along with any corresponding error information.

Figure 6:
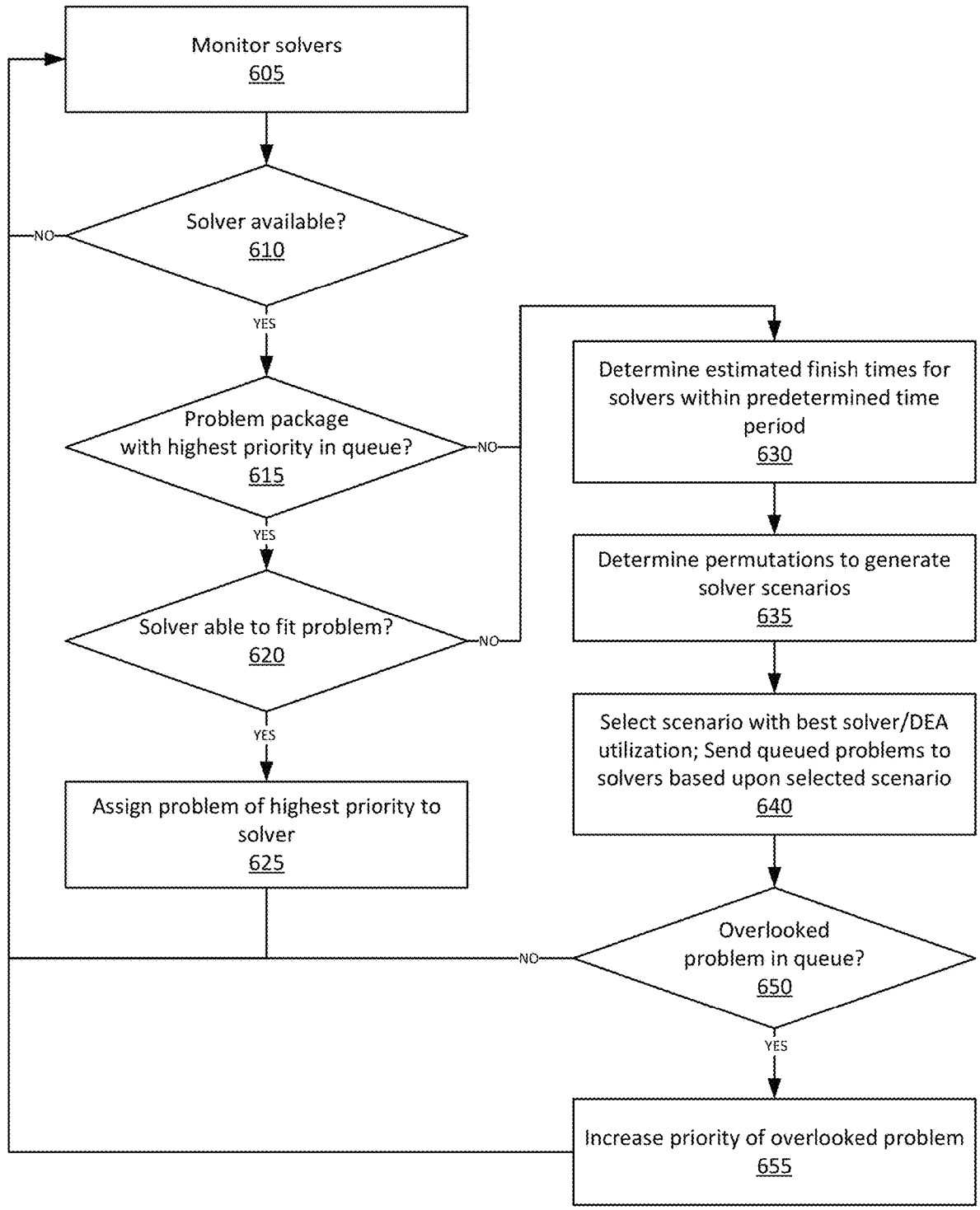
FIG. 6 is a flowchart illustrating a process for dispatching problems to solvers, in accordance with some embodiments.

FIG. 6 is a flowchart illustrating a process for dispatching problems to solvers, in accordance with some embodiments. As described above, the dispatch computer is used to optimize the use of the solvers by choosing between the various types and sizes of the solvers attached to it. The dispatch computer may dispatch problems to the solvers, based upon the priority of the enqueued problems, and the availability of solvers.

The dispatch computer monitors 605 each of a plurality of solvers. For example, the dispatch computer may maintain information indicating which solvers are currently processing which problems, and which solvers are available to take on new problems.

The dispatch computer determines 610 if a solver of the plurality of solvers is available to solve a new problem. In some embodiments, when a solver finishes solving a problem, the solver notifies the dispatch computer that it is done and ready to receive a new problem. If no solvers are currently available, the dispatch computer continues to monitor the solvers.

If a solver is available, the dispatch computer makes a determination on how to utilize the solvers to solve the problems currently enqueued in the problem queue. As discussed above, each enqueued problem package may be associated with a corresponding priority value. In some embodiments, the dispatch computer determines 615 if there is currently a problem package in the problem queue having a highest level of priority (or a priority level exceeding a threshold value).

If a problem package having the highest priority level exists, the dispatch computer determines 620 if the available solver is able to fit the problem. In some embodiments, each solver of the plurality of solvers may be optimized to solve domains of different sizes. In addition, different solvers may be configured to solve different types of differential equations. For example, if the available solver is configured to solve problems associated with the differential equation of the problem with domain sizes smaller than that of the identified problem package, the solver may not be able to solve the problem package. If the available solver is able to fit the problem (e.g., is configured to solve differential equations of the same type as those associated with the problem package and to solve domains at least the size of that of the problem package), the dispatch computer dispatches 625 the identified problem package having high priority to the solver.

On the other hand, if the available solver does not fit the problem, or if there is no queued problem having a high enough priority level, the dispatch computer may attempt to determine a scheme for efficiently distributing the queued problems to available solvers. In some embodiments, the dispatch computer determines 630 an estimated finish time for each monitored solver expected to finish solving its current problem within a threshold period of time. In some embodiments, the dispatch computer determines the estimated finish time for a solver by determining an estimated solve time for the solver (based on the known domain size of the problem package currently being solved by the solver, the type of differential equation, the size of the solver, etc.) and compares the estimated solve time to how much time the solver has already spent processing the problem. In some embodiments, the dispatch computer may query the solver to determine a current status of the solver (e.g., based upon a current time-step being processed by the solver) from which an estimated finish time can be determined. In some embodiments, the dispatch computer determines an initial estimated solve time for the solver when dispatching a problem package to the solver, and later may check or adjust the estimate based upon one or more queries to the solver.

The dispatch computer determines 635 one or more permutations to generate one or more solver scenarios. Each solver scenario corresponds to a different arrangement of how problems in the problem queue may be able to fit in the available solvers and solvers expected to become available with a predetermined time period (e.g., next n minutes). The dispatch computer analyzes the possible scenarios, each corresponding to a different permutation of problems assigned to solvers, and determines how well each scenario utilizes the available solvers/DEAs. In some embodiments, the dispatch computer determines a utilization score for each scenario, based upon a number or percentage of DEAs within each solver that will be utilized for solving, a number of problems able to be dispatched, an estimated finish time of the utilized solvers, or some combination thereof. For example, if a particular solver is able solve problems having a large domain, assigning a problem having a small domain to that solver may involve only a portion of the DEAs of the solver being assigned subdomains associated with the problem, potentially resulting in a lower DEA utilization of the solver. In some embodiments, the utilization score may further be based upon a priority level of problems dispatched to the solvers (e.g., a first scenario where more higher priority problems are dispatched to solvers may have a higher utilization score than a second scenario, even if the second scenario may result in the dispatch of more problems).

The dispatch computer selects 640 a scenario having a best solver/DEA utilization (e.g., highest utilization score), and sends queued problem packages to solvers in accordance with the selected scenario to be solved.

In some embodiments, a selected scenario may not be able to assign each queued problem to a solver, such as if the number of queued problems exceeds a number of available solvers. In some embodiments, the dispatch computer determines 650 if there are any problems overlooked by the selected scenario, and as such remain in the queue. If there are overlooked problems in the queue, the dispatch computer may cause 655 a priority level of the overlooked problems to be increased. For example, the dispatch computer may increment the priority level of each overlooked problem by a set amount, or in accordance with a predetermined function. The dispatch computer may then continue to monitor the solvers. Using this scheme, the dispatch computer is able to dispatch problems to solvers in such a way that will maximum solver/DEA utilization, while also ensuring that problems do not remained enqueued for too long (e.g., by only determining dispatch permutation scenarios if no currently queued problem has reached a threshold priority level).

Solver DEA Structure

Figure 7:
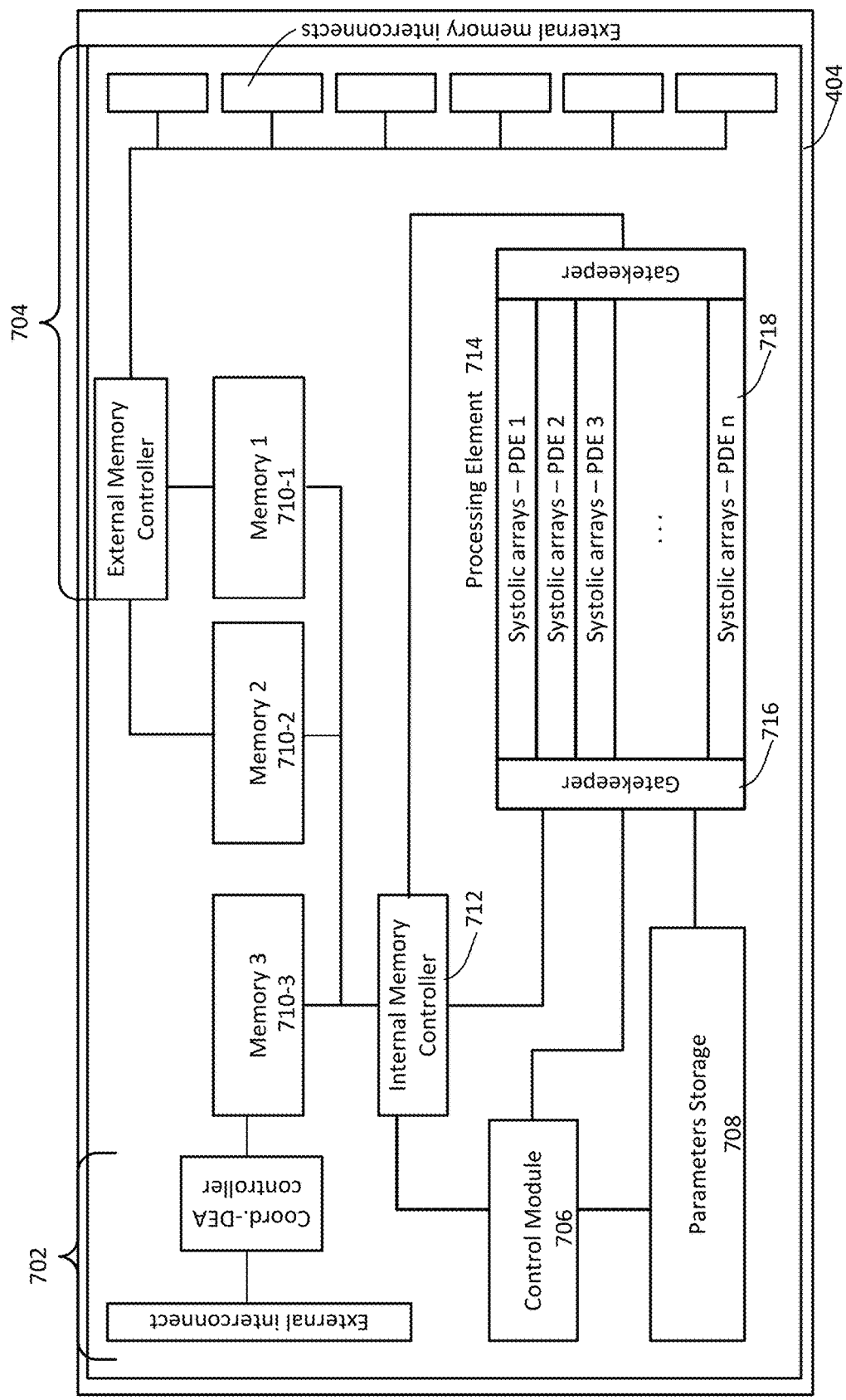
FIG. 7 illustrates a layout of a Differential Equation Accelerator (DEA), in accordance with some embodiments.

FIG. 7 illustrates a layout of a DEA 404, in accordance with some embodiments. The DEA comprises a coordinator-DEA interconnect and controller 702, which is a special circuit and interconnect that manages the data and control signals going back and forth between the DEA unit and the coordinator 402. For example, the DEA may receive problem and subdomain data from the coordinator 402 via the coordinator-DEA interconnect and controller 702. The DEA may also receive instructions from the coordinator 402 (e.g., synchronization instructions to synchronize with other DEAs of the solver, instructions to begin solving, etc.). In addition, the DEA may transmit generated solution information corresponding to the received problem and subdomain back to the coordinator through the coordinator-DEA interconnect and controller 702.

The external memory interconnect & controller 704 is a special circuit and interconnect that manages data and control signals between the various DEA units. For example, as will be discussed in greater detail below, in some embodiments, the DEA may require information relating to other subdomains being processed by other DEAs of the solver. As such, the DEA may receive additional subdomain data from other DEAs via the external memory interconnect & controller 704.

The control module 706 manages the overall functioning of the DEA unit. In some embodiments, the control module 706 is a processor that processes received subdomain data, determines and stores parameters associated with the problem subdomain (e.g., in the parameters storage 708), and manages solving of the problem subdomain (e.g., using the processing element 714) over a plurality of time steps.

The parameters storage 708 is configured to store local variables used during the solving of differential equations. In some embodiments, the parameters storage 708 is implemented as an SRAM. The stored local variables may include any type of variable expected to be highly used during solving of the problem assigned to the DEA that are not expected to change during the solving, such as subdomain data, solve type, and one or more constants to be used during the solving of the subdomain (e.g., fluid density, viscosity, etc.).

The memory 710 is used to store the problem to be solved. In some embodiments, the memory 710 each DEA is divided into three subunits (e.g., first memory unit 710-1, second memory unit 710-2, and third memory unit 710-3). In some embodiments, the memory units 710-1 through 710-3 are implemented as part of the same memory. In other embodiments, the memory units 710-1 through 710-3 are implemented as two or more separate memory chips.

In some embodiments, first and second memory units 710-1 and 710-2 are used in general solving of the differential equation, while the third memory unit 710-3 may be used when the DEA needs to send data back to the coordinator (e.g., via the coordinator-DEA interconnect and controller 702). In some embodiments, access to the memory units 710-1 to 710-3 is managed by the internal memory controller 712. For example, the internal memory controller 712 may receive instructions from the control module 706 to retrieve data between the first and second memory units 710-1 and 710-2 and the processing element 714, move processed data to the third memory unit 710-3 in preparation for transmission to the coordinator of the solver, and/or the like.

The processing element 714 is configured to receive problem data (e.g., from the first or second memory units 710-1 and 710-2) and to solve the received problem data using one or more systolic arrays. In some embodiments, the processing element 714 comprises one or more gatekeeper circuits 716 (also "gatekeepers 716") and a plurality of systolic array circuits 718 ("systolic arrays 718"). The gatekeepers 716 are circuits that divert data from memory (e.g., from the first or second memory units 710-1 and 710-2 via the internal memory controller 712) to the systolic arrays 718 and vice versa, depending on which equation is solved. For example, the gatekeeper 716 may receive information indicating a type of differential equation to be solved from the parameters storage 708 where solver parameters are kept, and select which systolic array 718 to use to process problem data received from the first memory unit 710-1 or the second memory unit 710-2.

The systolic arrays 718 each comprise hardware configured to solve a particular type of partial differential equation (PDE). Each systolic array 718 comprises a network of elements (e.g., processing elements and storage elements) configured to process a plurality of nodes of a received (sub-)domain in parallel. Each processing element of the systolic array is configured to compute a partial result as a function of the data received from its upstream elements, and to pass results to downstream elements. In some embodiments, the systolic arrays 718 comprise at least one systolic array for each type of PDE that the DEA is designed to solve (e.g., PDE1 through PDEn). For example, a systolic array may be configured to solve 1-D differential equations such as linear convection, non-linear convection, diffusion, Burger's equation, Laplace equation, Poisson equation, Euler's equation, Navier stokes simulations, etc. In some embodiments, a systolic array may be configured to solve a multi-dimensional differential equation. In some embodiments, depending on the similarity of the equation, different PDEs may be solved on the same systolic array with minor changes to the calculation made by gates of the systolic array based upon parameters provided by the parameters storage 508.

Figure 8:
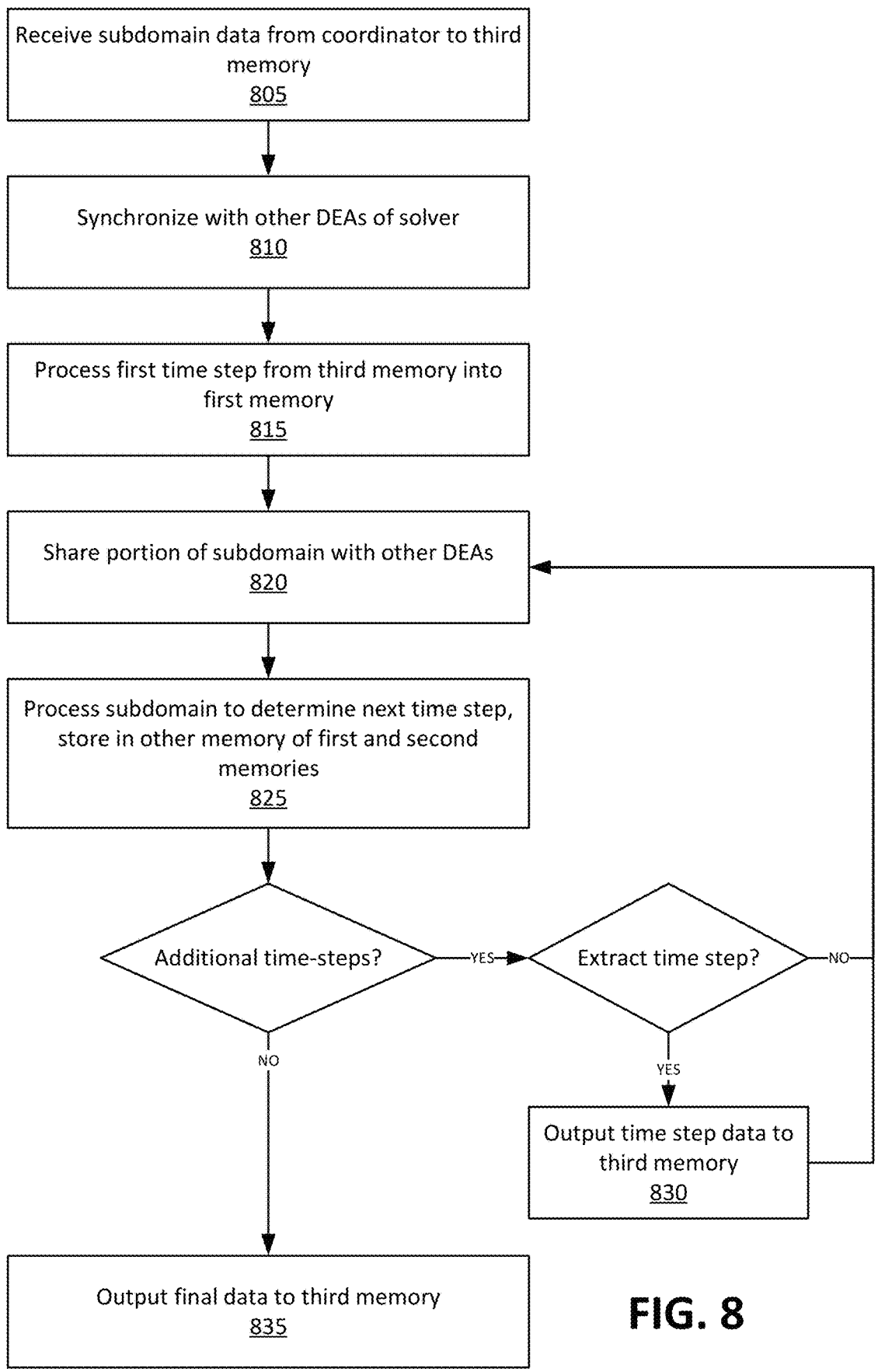
FIG. 8 is a flowchart of a process for using a DEA to solve a subdomain, in accordance with some embodiments.

The DEA is configured to solve a subdomain of the problem sent to it by the coordinator. FIG. 8 is a flowchart of a process for using a DEA to solve a subdomain, in accordance with some embodiments. The DEA receives 805 subdomain data from the coordinator of the solver. The received subdomain data may be copied into the third memory unit 710-3. In addition, the DEA may receive other data of the problem package, such as flow conditions, solve type, and constants such as fluid density and viscosity, which is copied into the parameters module 708. In some embodiments, each DEA may also receive external domain data part of the initial mesh, corresponding to portions of subdomains adjacent to the DEAs assigned subdomain, for use in determining the first time step for the subdomain.

Once all data has been disseminated by the coordinator to the DEAs of the solver, the DEA is synchronized 810 with the other DEAs of the solver by the coordinator. When all DEAs of the solver having an assigned subdomain are synced, the coordinator initiates solving, during which each DEA processes its assigned subdomain over a plurality of time steps. In some embodiments, the DEA begins solving 815 by processing the first time step of the whole subdomain stored in the third memory unit 710-3 using the processing element 714, storing the results of the processing into the first memory unit 710-1. The process may take 1 or more clock cycles. In some embodiments, memory sharing between DEAs may not need to be performed at this point, as external domain data corresponding to data from other subdomains needed to process the first time step for the subdomain may have been received from the initial mesh.

The DEAs of the solver are synchronized to concurrently perform each time step. In some embodiments, a DEA of the solver may communicate with one or more adjacent DEAs regarding their current status, allowing for the DEAs of the solver having assigned subdomains to begin processing of each time step synchronously. During each time step, the DEAs share 820 parts of subdomain stored in the first memory unit 710-1 as needed (e.g., subdomain data near a boundary of the another subdomain, which is needed by another DEA assigned the another subdomain for processing a next time step). In addition, each DEA processes 825 its respective subdomain through the processing element 714 to determine the next time step for the subdomain. In some embodiments, the processing element 714 receives the subdomain data from the first memory unit 710-1, and selects an appropriate systolic array 718 to be used for processing, using stored parameters from the parameters storage 708. The results of the processing are stored in the second memory unit 710-2. Although FIG. 8 illustrates 820 and 825 as separate steps, it is understood that these two steps may be performed concurrently.

The DEAs may repeat time stepping over a plurality of cycles (steps 820 and 825). Over each time step, the processing element receives the subdomain data from the first or second memory unit 710-1 or 710b, selects a systolic array for processing the subdomain data, and stores the processed subdomain data into the opposite memory unit (e.g., from the first memory unit 710-1 to the second memory unit 710-2, or vice versa). In addition, memory sharing with other DEAs may be performed concurrently. In some embodiments, the same systolic array may be used for each time step. In other embodiments, different systolic arrays may be selected, based upon the problem being solved. For example, when solving a combustion problem, a first pass may comprise one or more time steps in which a systolic array for solving fluid dynamics is selected, and a second pass may comprise one or more time steps using a systolic array for solving for the chemistry.

In some embodiments, if a data extraction for a particular time step is needed, then the processing element 714 may also output 830 the processed data to the third memory unit 710-3 along with to first or second memory unit 710-1 or 710b. The DEA may then inform the coordinator of the solver to download the time step data from the third memory unit 710-3. In addition, the DEA may concurrently continue to solve between the first and second memory units 710-1 and 710b, since the data download could last more than one clock cycle. In some embodiments, the DEA is configured to output its data to the third memory unit 710-3 for download by coordinator as "snapshots" at predetermined intervals (e.g., every predetermined number of time-steps) or in accordance with a predetermined function. In other embodiments, these snapshots may be taken dynamically. The snapshot data may be used to analyze how the solution of the problem package evolves over time, and/or to perform accuracy checks (e.g., verify that momentum or energy are conserved).

In some embodiments, a number of time steps to be solved may be explicitly indicated as part of the problem package. In other embodiments, the problem may be implicit, in which the solver solves until a specified parameter reaches a predetermined value. For example, the solver, at each time step, may check the root mean square of the velocities and stop solving once it has reached a certain critical value. In some cases, a maximum number of steps may be specified, in case the aggregate critical value is not reached.

At the completion of solving, the final processed data may be output 835 by the processing element 714 to the third memory unit 710-3. The DEA then informs the coordinator to download the solved data for the subdomain from the third memory unit 710-3. The coordinator, upon downloading the solved subdomain data from each of the plurality of DEAs, may assemble the solved subdomain data into a solutions package for the domain.

By dividing the memory of the DEA into first and second memory units 710-1 and 710-2, the DEA ensures that processed data for each time step can be written to memory without disturbing the original pre-time step data until processing of the entire subdomain is completed. In addition, the third memory unit 710-3 allows for data to be extracted and sent to the coordinator without interrupting time step processing of the subdomain data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A system for solving differential equations, comprising:
   a plurality of solver units, each comprising a plurality of differential equation accelerators (DEAs);
   a dispatch circuit configured to identify one or more problem packages, each problem package indicating at least a differential equation to be solved and a domain, and dispatch a problem package of the identified problem packages to a selected solver unit of the plurality of solver units,
   wherein the selected solver unit is configured to, responsive to receiving the problem package:
      divide the domain of the problem package into a plurality of subdomains;
      assign each of the plurality of subdomains to a respective DEA of the solver unit, each DEA comprising hardware configured for incrementally solving its assigned subdomain based upon the differential equation over a plurality of steps;
      in response to determining that all DEAs of the solver unit having an assigned subdomain have received data corresponding to their respective assigned subdomain, initiate solving by the DEAs, such that each of the DEAs having an assigned subdomain solves for a particular step concurrently;
      receive solved subdomains from the respective DEAs having assigned subdomains; and
      assemble the received solved subdomains into a solved domain.

2. The system of claim 1, where the dispatch circuit is configured to:
   monitor the plurality of solver units;
   responsive to a determination that a solver unit of the plurality of solver units is available and that the problem package one of the one or more problem packages has a priority level of at least a threshold level, dispatch the problem package to the solver unit if the solver unit fits the problem package.

3. The system of claim 1, wherein the dispatch circuit is further configured to:
   responsive to determining that the one or more identified problem packages does not include a problem package having a priority level of at least a threshold level, determine estimated finish times for solver units of the plurality of solver units that are within a predetermined time period;
   based upon the estimated finish times, determine one or more scenarios, each corresponding to a permutation of problem packages of the one or more problem packages assigned to solver units of the plurality of solver units;
   determine, for each scenario, a utilization metric based at least in part on a level of utilization of DEAs of the plurality of solver units under the scenario;
   select a scenario of the one or more scenarios, based upon the determined utilization metric for each scenario; and
   dispatch problem packages of the one or more problem packages to solver units of the plurality of solver units in accordance with the selected scenario.

4. The system of claim 3, wherein the dispatch circuit is further configured to:
   determine that the one or more problem packages includes one or more additional problem packages not assigned to a solver unit of the plurality of solver units in accordance with the selected scenario;
   increase a priority level of each of the one or more additional problem packages.

5. The system of claim 3, wherein the utilization metric for a scenario of the one or more scenarios is further based upon a number of problem packages assigned to solver units under the scenario and an estimated finish time associated with the solver units assigned problem packages under the scenario.

6. The system of claim 3, wherein the level of utilization of DEAs of the plurality of solver units for a scenario of the one or more scenarios is based upon a percentage of DEAs of a solver unit of the plurality of solver units that would be utilized to solve a problem package assigned to the solver unit under the scenario.

7. The system of claim 3, wherein the dispatch circuit is configured to determine estimated finish times for solver units of the plurality of solver units that are within a predetermined time period comprises by determining, for a solver unit of the plurality of solver units, an estimated solve time for the solver unit based a problem package currently being solved by the solver unit, and an amount of time already spent by the solver unit in processing the problem package.

8. The system of claim 1, wherein DEAs of the selected solver unit having respective assigned subdomains are further configured to communicate with each other to synchronize solving for each step of the plurality of steps.

9. A system for solving differential equations, comprising:
   a plurality of solver units;
   a dispatch circuit configured to dispatch problem packages of a plurality of problem packages to solver units of the plurality of solver units, wherein each problem package indicates at least a respective differential equation to be solved and a domain, wherein the dispatch circuit is configured to:
      determine estimated finish times for solver units of the plurality of solver units;
      based upon the estimated finish times, determine one or more scenarios, each corresponding to a permutation of problem packages of the plurality of problem packages assigned to solver units of the plurality of solver units;
      select a scenario of the one or more scenarios, based upon a determined utilization metric of the plurality of solver units for each scenario; and
      dispatch problem packages of the plurality of problem packages to solver units of the plurality of solver units in accordance with the selected scenario.

10. The system of claim 9, wherein the dispatch circuit is configured to determine the one or more scenarios based upon solver units of the plurality of solver units having estimated finish times within a predetermined time period.

11. The system of claim 9, wherein the dispatch circuit is further configured to, responsive to determining that the plurality of problem packages includes one or more additional problem packages not assigned to a solver unit of the plurality of solver units in accordance with the selected scenario, increase a priority level of each of the one or more additional problem packages.

12. The system of claim 9, wherein the dispatch circuit is configured to determine the utilization metric for the scenario based upon a number of problem packages assigned to solver units under the scenario and an estimated finish time associated with the solver units assigned problem packages under the scenario.

13. The system of claim 9, wherein each of the plurality of solver units comprises a respective plurality of differential equation accelerators (DEAs), each DEA comprising hardware configured for incrementally solving an assigned subdomain based upon a differential equation over a plurality of steps.

14. The system of claim 13, wherein the dispatch circuit is configured to determine the utilization metric for the scenario based upon a level of utilization of DEAs of the plurality of solvers under the scenario.

15. A non-transitory computer readable medium comprising stored instructions that, when executed by at least one processor, configure the at least one processor to dispatch problem packages of a plurality of problem packages to solver units of a plurality of solver units, based upon an availability of the plurality of solver units, wherein each problem package indicates at least a respective differential equation to be solved and a domain, by:
    determining estimated finish times for solver units of the plurality of solver units;
    based upon the estimated finish times, determining one or more scenarios, each corresponding to a permutation of problem packages of the plurality of problem packages assigned to solver units of the plurality of solver units;
    selecting a scenario of the one or more scenarios, based upon a determined utilization metric of the plurality of solver units for each scenario; and
    dispatching problem packages of the plurality of problem packages to solver units of the plurality of solver units in accordance with the selected scenario.

16. The non-transitory computer readable medium of claim 15, wherein the stored instructions, when executed by the at least one processor, further configure the at least one processor to determine the one or more scenarios based upon solver units of the plurality of solver units having estimated finish times within a predetermined time period.

17. The non-transitory computer readable medium of claim 15, wherein the stored instructions, when executed by the at least one processor, further configure the at least one processor to, responsive to determining that the plurality of problem packages includes one or more additional problem packages not assigned to a solver unit of the plurality of solver units in accordance with the selected scenario, increase a priority level of each of the one or more additional problem packages.

18. The non-transitory computer readable medium of claim 15, wherein the stored instructions, when executed by the at least one processor, further configure the at least one processor to determine the utilization metric for the scenario based upon a number of problem packages assigned to solver units under the scenario and an estimated finish time associated with the solver units assigned problem packages under the scenario.

19. The non-transitory computer readable medium of claim 15, wherein each of the plurality of solver units comprises a respective plurality of differential equation accelerators (DEAs), each DEA comprising hardware configured for incrementally solving an assigned subdomain based upon a differential equation over a plurality of steps.

20. The non-transitory computer readable medium of claim 19, wherein the stored instructions, when executed by the at least one processor, further configure the at least one processor to determine the utilization metric for the scenario based upon a level of utilization of DEAs of the plurality of solvers under the scenario.

* * * * *